Oct. 23, 1945.　　　　W. H. STANGLE　　　　2,387,621
ROTATABLE BROILING APPARATUS
Filed May 20, 1943　　　2 Sheets-Sheet 1
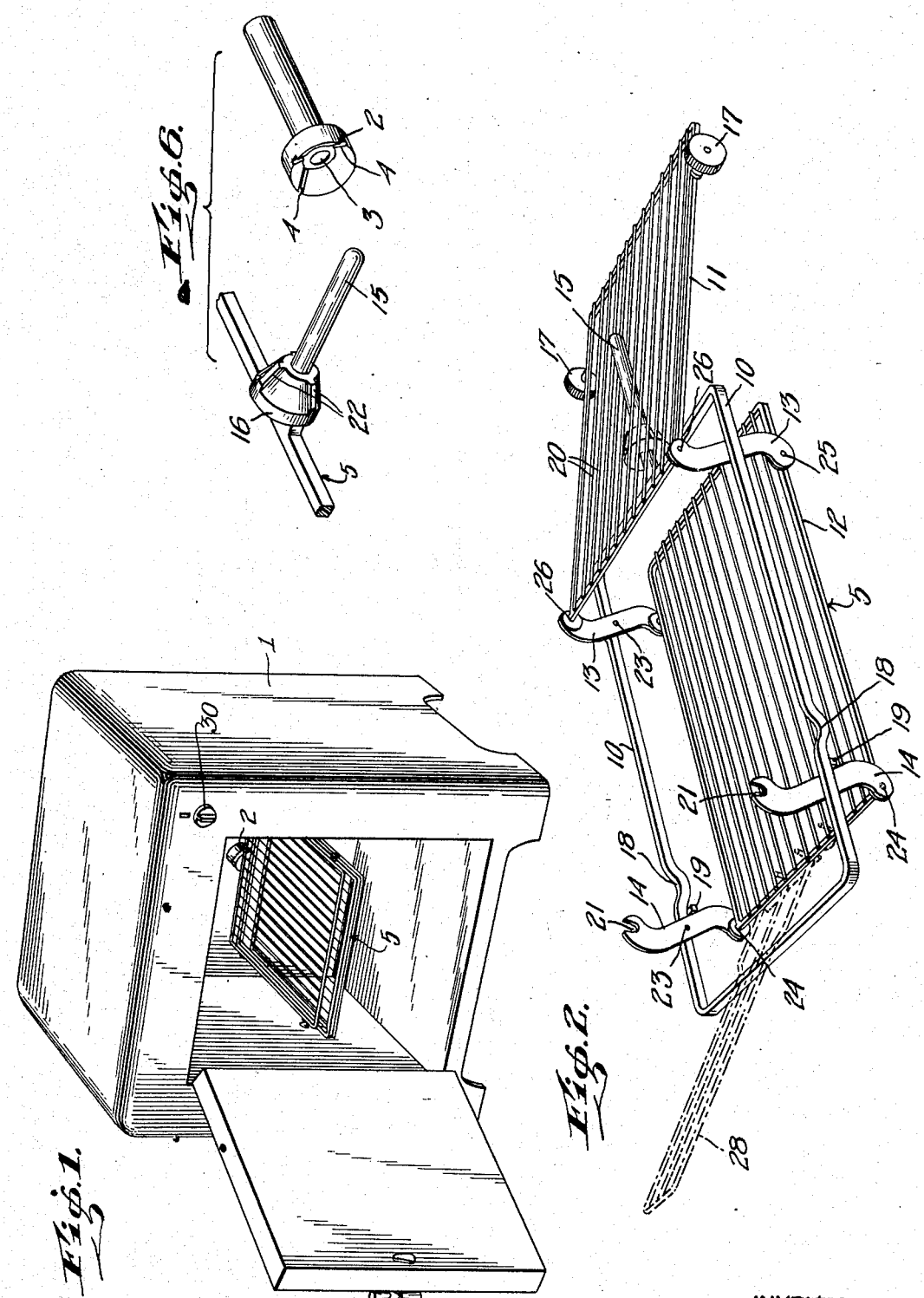
INVENTOR
WILLIAM H. STANGLE - DECEASED
BY CITIZENS TRUST & SAVINGS BANK
ADMINISTRATOR
BY J. H. Kelly ATTORNEY Oct. 23, 1945.　　　　W. H. STANGLE　　　　2,387,621
ROTATABLE BROILING APPARATUS
Filed May 20, 1943　　　　2 Sheets-Sheet 2
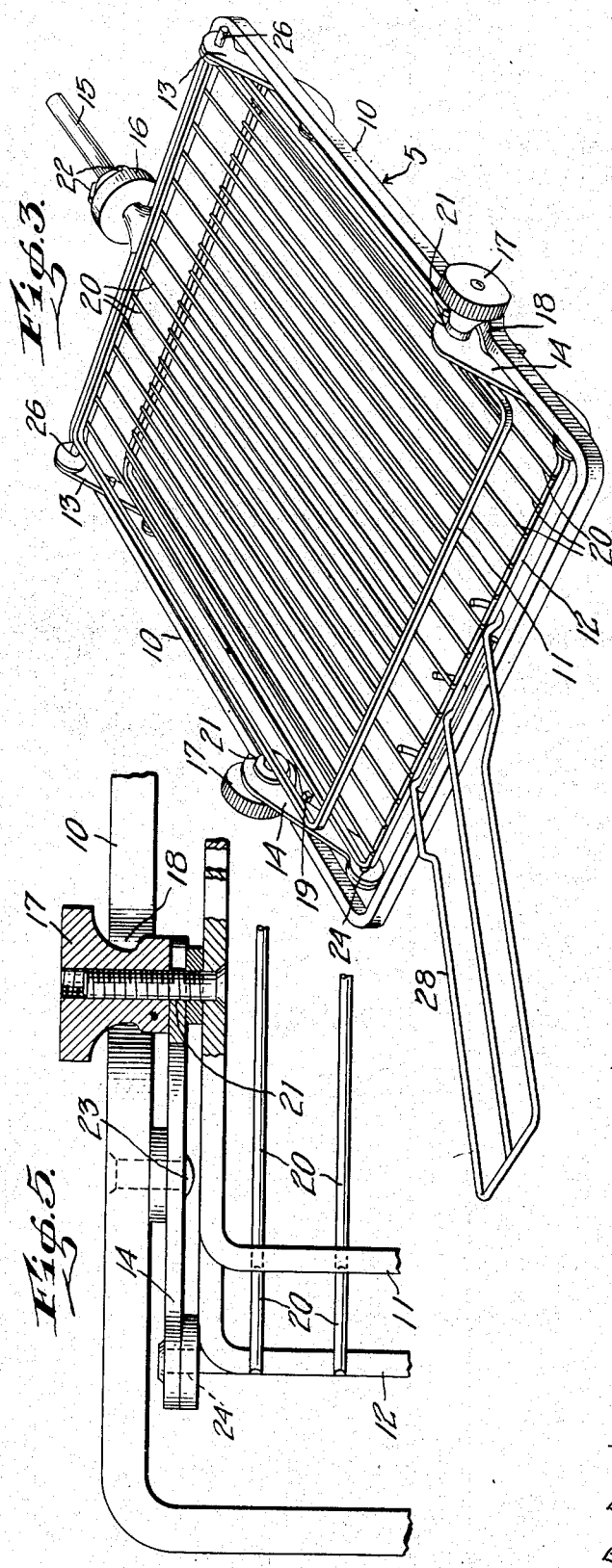
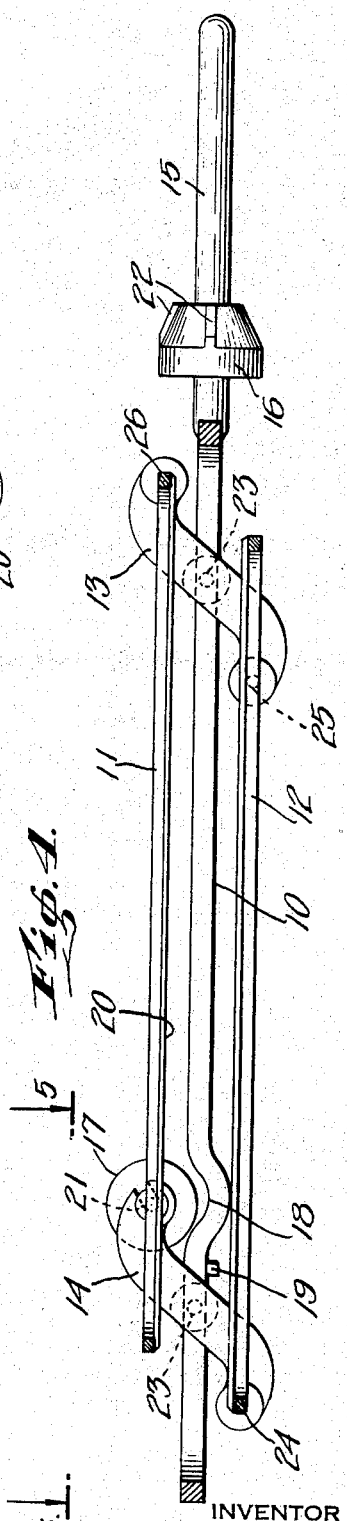
INVENTOR
WILLIAM H. STANGLE, DECEASED
BY CITIZENS TRUST & SAVINGS
BANK ADMINISTRATOR
BY J. H. Kelly
ATTORNEY Patented Oct. 23, 1945

2,387,621

UNITED STATES PATENT OFFICE 2,387,621

ROTATABLE BROILING APPARATUS

William H. Stangle, deceased, late of Evansville, Ind., by Citizens Trust & Savings Bank, administrator, Evansville, Ind., assignor to Servel, Inc., New York, N. Y., a corporation of Delaware Application May 20, 1943, Serial No. 487,733

11 Claims. (Cl. 99—397)

This invention relates to an improved apparatus for broiling foods, such as steaks, chops, fish, and like foods having two generally flat parallel surfaces.

In order to understand the development of this broiling apparatus it is well to recognize the meaning of the real broiled food products. Dietitians agree that broiled foods are superior in digestive and nutritional values. It is generally agreed that the better broiled products have been produced over a glowing charcoal bed. However, the use of a charcoal bed in a domestic range is quite troublesome and inconvenient. The domestic range broiler, so far, does not produce broiled products that approach the charcoal broiled foods. The handling of food into and out of most broilers is a difficult, hazardous and uncomfortable task. There is too much heat and hot fat striking the housekeeper in the face and on the hands and arms. There is too much wrestling with the food into and out of the hot compartment, especially during the turning-over operation.

As a result of numerous experiments conducted in connection with the cooking of steaks, chops, fish, and the like, it has been confirmed that the best results are obtained by broiling such foods and it has been found that the nearest approach to 100 per cent broiling, as compared to part broiling, part roasting and part frying, in a domestic range, is obtained by supporting the food in an open wire grill at a fixed distance beneath a source of radiant heat in an open chamber with a minimum amount of metal contacting the food. Also with foods having two generally flat parallel sides, the food should be supported in the broiling chamber in such a manner that each of the two sides when facing the heat source is the same fixed distance from said heat source, and that the heat source produces true radiant heat of known intensity. With this arrangement, it has been found that the food is broiled by direct radiant heat with little or no heat being conducted from the chamber to the food by convected heat, consequently roasting is minimized. Also since the food is not resting on a hot grease retaining surface, as when a conventional broiler pan is used, frying is minimized, and a broiled food is obtained which is believed to be equal to, if not superior in flavor, to that produced over a charcoal bed.

An important object of this invention is to provide a broiling chamber with a source of radiant heat contained therein, and wherein a broiling grill or carriage may be rotatably supported in such a manner that it is free of the walls of said chamber except for a relatively small supporting area at one end of said grill.

Another and equally important object of this invention is to provide an improved broiling grill wherein food to be broiled may be placed between two open work retaining members, and the mere placing and securing of the food between these retaining members automatically centers the food in the grill so that when the grill is applied to the broiling chamber the two flat surfaces of the food will each be the same distance from the heat source when facing said heat source.

These and other advantages, aims and objects, are attained by the novel construction and combination of parts hereinafter described and shown in the accompanying drawings, constituting an essential part of this disclosure, and in which:

Fig. 1 is a perspective view of a broiling chamber showing a broiling grill embodying this invention positioned therein;

Fig. 2 is a perspective view of the improved grill in open position;

Fig. 3 is a perspective view of the improved grill in closed position;

Fig. 4 is a longitudinal sectional view of the improved grill;

Fig. 5 is an enlarged view partly in section of a corner of the grill illustrating the manner of connecting the grid members to the frame; and Fig. 6 is an exploded view showing a means for supporting the grill in the broiling chamber.

Referring to the drawings, wherein similar numerals of reference indicate corresponding parts in all the figures, I designates generally a broiling chamber adapted to receive the improved grill. In the illustration there is shown a rotary supporting element 2 associated with the back of the chamber. This element comprises a turning spool with a center opening 3 extending therethrough and a plurality of spaced grooves 4 in the counter-sunk portion thereof adapted to detachably receive and rotate the rotary grill. A source of radiant heat (not shown) is located in the upper part of the chamber and extends over substantially the entire upper surface thereof. A drip pan or tray (not shown) may be placed in the lower part of the chamber.

The rotary grill 5, Figs. 2 to 5 inclusive, consists of a rectangular frame 10, an upper open work grid 11, a lower open work grid 12, a first pair of S-shaped links 13, a second pair of S-shaped links 14, a shaft 15, a hub 16, and a pair of clamping screws 17.

The frame member 10 is made of square rod approximately one-quarter inch thick. At approximately one-third of the length of this frame, as viewed from the left in Fig. 2, for instance, are located depressions 18 and stop elements 19 to be referred to hereinafter. The shaft 15 is integrally connected at one end of this frame member 10, at the center thereof, and is adapted to fit into the opening 3 of the turning spool located at the back of the broiling chamber. The collar or hub 16 is attached to the shaft 15 and has three spaced splines 22 located on the conical portion thereof, which splines are adapted to engage in grooves 4 in the turning spool to effect a driving engagement between the spool and the grill assembly. In the particular embodiment of the invention illustrated herein, there is shown three such grooves 4 spaced substantially 90° apart through substantially one half the circumference of the spool 2, and three splines 22 spaced in like manner around one-half the circumference of the hub 16. With this arrangement the spool may be properly set to receive the hub so that the grill will be in upright horizontal position when placed in the broiling chamber.

The upper and lower grid members 11 and 12 each consist of a rectangular frame of square rod approximately one-eighth inch thick and a plurality of wires 20 which extend parallel with the sides of the grid frame and are rigidly connected to the ends of the frame and spaced apart in a transverse direction of said frame.

The S-shaped links are pivoted at their centers to the longitudinal sides of the rectangular frame 10, as at 23, and are spaced equi-distant from the ends of said frame. The lower grid member 12 is journaled at one end in the lower ends of S-links 14, as at 24, and near its opposite end in the lower ends of S-links 13, as at 25. The upper grid member 11 is journaled at one end in the upper ends of S-links 13, as at 26. Adjacent the other end of the upper grid 11 clamping screws 17 are provided so that this end of the upper grid may be quickly secured to and removed from the slotted upper ends 21 of S-links 14.

The grids 11 and 12 and S-links 13 and 14 form a pantograph mounted on the frame member 10. The arrangement is such that the grids may be moved toward each other until they contact, as shown in Fig. 3; they may be moved a maximum distance apart, depending on the length of the S-links; or they may be moved to any intermediate position, as shown in Fig. 4, and in each case the two grids will always be in parallel relation with each other and will always be equal distance from the plane of the frame 10 for any one adjustment of said grids. As shown in Fig. 2, rotation of the S-links 14 in a counter-clockwise direction about their pivots 23 is limited by the stop elements 19. This arrangement prevents the grid members from collapsing one toward the other when the screws 17 are loose, as when the top grid is being fastened or unfastened into the slots 21 of these links.

With the rotating support positioned at a fixed distance from the heat source and with the arrangement of the shaft 15 and parallel grid members 11 and 12 on the frame 10, each side of the food as it is being broiled will be the same distance from the heat source. In other words, the center of a thick steak, for instance, will be the same distance from said heat source as the center of a thin steak.

At the front of the broiling chamber there is provided a turning dial 30 which is connected to the spool 2 by any conventional linkage (not shown) so that by turning said dial through say 180° the spool and attached grid will be turned through 180°. Also by proper indicia on the turning dial the position of the grooves in the spool may be readily ascertained. With the dial pointing vertically upward, for instance, as shown in Fig. 1, the operator knows that the spool is properly positioned so as to receive the grill in an upright horizontal position.

The door of the broiler chamber may be left open or closed as desired. However, it has been found that a more truly broiled end product may be obtained by leaving the door at least partly open so as to eliminate excessive heat in the chamber to thereby effect a true broiling from radiant heat as compared to part broiling by radiant heat and part roasting by convection.

In the use of this improved grill, the user turns back the upper grid section to the position shown in Fig. 2, places the food to be broiled on the lower grid section, puts the upper grid in place parallel to the lower grid, and by pressing down upon this upper grid section, the distance between the grids is decreased and the food is firmly secured between the upper and lower grid members. Then the clamping screws are tightened, the assembly with the food secured between the parallel grids is then inserted into the broiling oven with the shaft 15 and splines 22 fitting into the opening 3 and grooves 4, respectively, of the turning spool. With the grill positioned in the broiling chamber, as viewed in Fig. 1, it is seen that the grill is free of the walls of the chamber except for the rotary support, and with this arrangement there is little or no heat transmitted to the grill by conducion; consequently frying action is practically eliminated. Also with the chamber door open, or at least partially open, the chamber does not heat up to any great extent, and very little heat is transmitted to the food by convection; consequently roasting of the food by convected heat is substantially eliminated. When the food has been broiled on one side as desired the assembly is turned through 180°, as by manually turning the dial 30 through 180°, or the assembly may be automatically turned after a predetermined time by means of an electric or spring motor, or the like (not shown), and the food is allowed to broil on the opposite side. The assembly is then removed from the chamber, placed on a work surface, the clamping screws are loosened and the upper grid opened to permit removal of the broiled food. A detachable handle 28 is provided for convenience in removing the grill assembly from the broiler chamber.

For the sake of simplicity in illustrating one form of the invention there has been shown the broiling grill applied to a separate broiling chamber. However, it is understood that this broiling grill may be applied to the broiling chamber of a conventional domestic range with equal facility. Also while the rotary grill is shown in operative position horizontally beneath a source of radiant heat, it is not limited to this position and may be arranged to broil foods in a vertical position either at one side of the heat source, in which case each side of the food as it is being broiled will be equi-distant from the heat source, or the grill may be positioned vertically between two heat sources, in which case the grill will not need to be turned and the food will broil simultaneously and uniformly on each side.

The foregoing description and accompanying drawings disclose a preferred embodiment of this invention, but it will be understood that this disclosure is merely illustrative and that such changes in the invention may be made as are fairly within the scope and spirit of the following claims.

What is claimed is:

1. In a broiling grill, a supporting member, a stub shaft projecting outwardly from one end of said supporting member, a pair of grids pivotally mounted in adjustable spaced parallel relation on opposite sides of said supporting member equidistant from the longitudinal axis of said shaft, and fastening mechanism associated with said grids for holding said grids in adjustable spaced relation with each grid equidistant from the longitudinal axis of said shaft for any one adjustment of the spacing of said grids.

2. In a broiling grill, a rectangular frame, an elongate link pivotally mounted on said frame near each corner thereof, a first grid pivotally mounted on said links on one side of said frame, a second grid pivotally mounted on said links on the opposite side of said frame, and fastening mechanism associated with said grids for adjustably securing said grids in parallel relation spaced equidistant from opposite sides of said frame.

3. In a broiling device, a body member, a shaft projecting outwardly from said body member for supporting said body member in a broiling chamber, a plurality of links movably mounted on said body member, a pair of adjustable parallel grids movably mounted on said links spaced equidistant from the longitudinal axis of said shaft, and clamping mechanism associated with said grids for adjustably holding said grids in spaced parallel relation with the grids always being equidistant from the longitudinal axis of said shaft for any one adjustment of the spacing of said grids.

4. In a device for broiling steaks, chops and like foods, a supporting member, a shaft projecting outwardly from one end of said supporting member for suspending said member in a broiling chamber, a pair of grids for receiving food to be broiled therebetween, said grids being spaced equidistant from each side of the longitudinal axis of said shaft, means mounting said grids on said supporting member for unitary oblique movement toward and away from each other, means incorporated in said mounting means for simultaneously moving said grids toward and away from each other and fastening mechanism associated with said grids for adjustably holding said grids in spaced parallel relation with each of said grids being always equidistant from the longitudinal axis of said shaft for any one spacing of said grids.

5. In a broiling grill, a supporting member, a pair of elongate links pivotally mounted near one end of said member, a second pair of links pivotally mounted on said member near the opposite end thereof, a first grid pivotally mounted on each of said links on one side of said supporting member, a second grid pivotally mounted on said first pair of links and detachably supported by said second pair of links in parallel relation to said first grid and on the opposite side of said supporting member, and securing mechanism associated with said grids and said links for securing said grids in spaced parallel relation to each other and equidistant from each side of said supporting member.

6. In a broiling grill, a supporting member, a plurality of links pivotally mounted on said supporting member, a first grid pivotally mounted on one pair of said links and detachably mounted on a second pair of said links on one side of said supporting member, a second grid movably mounted on said links on the opposite side of said supporting member in parallel relation to said first grid, each of said grids being mounted on said links equidistant from a central longitudinal plane through said supporting member, and securing mechanism associated with said grids for adjustably holding said grids in parallel relation equidistant from the central longitudinal plane of said supporting member.

7. In a broiling grill, a rectangular frame, a shaft projecting outwardly from one end thereof by which said frame may be mounted in a broiling chamber, a plurality of links pivotally mounted on said frame and projecting in opposite directions from a mid-longitudinal plane of said frame, a pair of spaced parallel grids mounted on said links on opposite sides of said frame for unitary oblique movement toward and away from each other, and fastening mechanism associated with said links and said grids for holding said grids in spaced parallel relation.

8. In a broiling grill, a rectangular frame, a shaft projecting outwardly from one end of said frame for supporting said frame in a broiling chamber, a plurality of elongate links pivotally mounted on said frame and projecting from each side of a central longitudinal plane through said shaft, a grid pivotally mounted on said links on one side of said longitudinal plane, a second grid pivotally mounted on said links on the opposite side of said longitudinal plane, and securing mechanism associated with said grids for adjusting the space between said grids and for holding said grids in spaced parallel relation equidistant from each side of said longitudinal plane.

9. In a broiling grill, a supporting member, a plurality of elongate links pivotally connected to said supporting member near opposite ends thereof, a grid pivotally connected to one end of each of said links, a second grid pivotally connected to the opposite ends of one pair of said links and detachably supported by the opposite ends of a second pair of said links, and fastening mechanism carried by said second grid and cooperating with said second pair of links for adjustably securing said grids against movement relative to each other and to said supporting member.

10. In a broiler, an invertible grill comprising a support member, a pair of adjustably-spaced grids for holding food therebetween, linkage joining said grids and support member and so constructed and arranged as to transmit space-adjusting movement from one to the other of said grids while holding them mutually parallel and symmetrically located relative to said support, a hinged connection between one of said grids and said linkage, said one grid being releasable from said linkage except for the hinged connection thereto permitting ready insertion and removal of food, and mechanism operable to lock said linkage in any one of a number of positions.

11. In a broiler, a grill as set forth in claim 10, in which said mechanism is also operable to simultaneously unlock said linkage and release said one grid from said linkage except for said hinged connection.

CITIZENS TRUST & SAVINGS BANK,
By ADOLPH C. FROELICH,
                                      Vice-Pres.,
Administrator of the estate of William H. Stangle, deceased.